(12) United States Patent
Ickert

(10) Patent No.: US 7,262,372 B2
(45) Date of Patent: Aug. 28, 2007

(54) LEADTHROUGH ELEMENT

(75) Inventor: Michael Ickert, Hamburg (DE)

(73) Assignee: Airbus Deutschland GmbH (DE)

( * ) Notice: Subject to any disclaimer, the term of this patent is extended or adjusted under 35 U.S.C. 154(b) by 183 days.

(21) Appl. No.: 11/019,586

(22) Filed: Dec. 21, 2004

(65) Prior Publication Data

US 2005/0133243 A1 Jun. 23, 2005

(30) Foreign Application Priority Data

Dec. 22, 2003 (DE) .............................. 103 60 487

(51) Int. Cl.
*H02G 3/18* (2006.01)
(52) U.S. Cl. .............. 174/650; 174/152 G; 174/153 G; 16/2.1; 16/2.2
(58) Field of Classification Search ........... 174/152 G, 174/152 R, 151, 135, 153 G, 480, 650, 654, 174/659, 660, 668; 16/2.1, 2.2; 248/56; 439/604, 587, 274, 275

See application file for complete search history.

(56) References Cited

U.S. PATENT DOCUMENTS

| | | | | |
|---|---|---|---|---|
| 2,592,949 A | * | 4/1952 | Philipson | ................ 174/152 G |
| 2,922,836 A | * | 1/1960 | Brown | ...................... 174/53 G |
| 3,229,026 A | * | 1/1966 | Sulzer | ........................... 16/2.1 |
| 3,424,857 A | * | 1/1969 | Miller et al. | ............. 174/153 G |
| 3,564,113 A | * | 2/1971 | Kindler | .................... 174/153 G |
| 4,125,238 A | * | 11/1978 | Tanaka | ......................... 248/56 |
| 4,289,923 A | * | 9/1981 | Ebert | ...................... 174/153 G |
| 4,763,541 A | * | 8/1988 | Spease | ......................... 248/56 |
| 5,567,916 A | * | 10/1996 | Napiorkowski et al. | 174/153 G |
| 5,836,048 A | * | 11/1998 | Rossman et al. | ....... 174/153 G |
| 5,836,212 A | * | 11/1998 | Bates | .......................... 248/73 |
| 7,049,515 B1 | * | 5/2006 | Collins et al. | ................ 174/50 |

FOREIGN PATENT DOCUMENTS

| | | |
|---|---|---|
| CH | 684667 A5 | 11/1994 |
| DE | 89 00 748 U1 | 6/1989 |
| DE | 94 21 751 U1 | 8/1996 |
| DE | 196 40 816 A1 | 4/1997 |
| DE | 198 06 603 C1 | 8/1999 |

* cited by examiner

*Primary Examiner*—Angel R. Estrada
(74) *Attorney, Agent, or Firm*—Ostrolenk, Faber, Gerb & Soffen, LLP

(57) ABSTRACT

Leadthrough elements for waterproof or airtight leading through of one or several lines are often associated with a disadvantage in that the led-through lines are routed largely without protection, and in that the tight seal between the leadthrough element and the line deteriorates in the course of mechanical loads being exerted on the lines. According to one embodiment of the present invention, a leadthrough element is provided in which each line exits in such a way from the top of the leadthrough element that the line after exiting runs flat along the top of the leadthrough element. By integrating this leadthrough element in a floor panel of an aircraft, in particular an Airbus A380, an advantageous seal of the line leadthrough is ensured, wherein the leadthrough element protects the line against increased mechanical loads, and thus ensures a permanent seal of the line leadthrough, with said seal meeting the quality requirements of the aircraft industry even in the case of increased mechanical loads.

17 Claims, 5 Drawing Sheets

LEADTHROUGH ELEMENT

FIELD OF THE INVENTION

The present invention relates to a leadthrough element for leading lines through. In particular, the present invention relates to a leadthrough element for leading one or more lines through, e.g. a wall of a structure, in a waterproof manner.

TECHNOLOGICAL BACKGROUND OF THE INVENTION

Generally speaking, such leadthrough elements are affixed to a wall of a control cabinet, a dividing wall, a floor panel or the like. Affixing the leadthrough element to the wall generally speaking takes place by clamping, screwing or gluing.

From DE 19640816 a sealing element for multi-conductor line systems which are embedded in adhesive tape is known, wherein sealing between the sealing element and the line systems takes place in that the line system, which comprises the adhesive tape, is fed through the sealing element and is compressed by said sealing element such that even pressure is exerted onto the line system, and the line system is pressed against the interior wall of the through-aperture so that positive locking results. To this effect, clamping elements for connecting the two pressing elements are provided. While this results in a largely waterproof connection between the line system and the sealing element, however, the line system, which comprises a multitude of conductors, leaves the sealing element essentially perpendicularly. This can be disadvantageous in particular in cases where the sealing element has been built into a floor panel, because as a result of exiting perpendicularly, the loom of cables is poorly protected against mechanical loads which frequently occur in particular in the floor area of a highly frequented space. If, as in the specific case, a line has to be placed flat along the floor in a duct after having been fed-through perpendicularly, the system shown is also not suitable for routing a line because the tail of the cable juts out perpendicularly from the floor.

Furthermore, the described sealing element is associated with a disadvantage in that the line system is connected to the sealing element by means of a large press. However, the use of such a large press is unsuitable in narrow and angular installation spaces in which a sealing cable leadthrough is to be used. In particular, when retrofitting already existing line systems or looms of cables with a waterproof cable leadthrough, the aforementioned press tool has to be available—a factor which represents a considerable additional expense from the point of view of both logistics and finance. For use in an aircraft, this requires having the installation tool available worldwide. Each airport of the respective airline has to have such a tool available for maintenance work.

It is also known among the experts to produce waterproof regions in a wiring system, such as for example a cable harness, by sealing interspaces in a leadthrough by means of molten casting resins or multi-component adhesives, for example by extrusion coating the conductors by means of the injection moulding process, by embedding in foam or in gel.

These known methods for sealing line leadthroughs by means of extrusion coating the lines by embedding in foam or in gel may be associated with a disadvantage in that, in particular with the use of molten casting resins, heat protection must be provided for the lines. Furthermore, closing a hole by means of a gel or the like requires the presence of a type of carrier plate in the aperture, since otherwise the sealing compound would be injected into empty space and would fail to fulfill the required purpose.

Said purpose can for example be achieved in the form of a shrinkable sleeve which is able to withstand heat, wherein such a shrinkable sleeve is threaded onto the line. Furthermore, it is required for the injected resins or adhesives to be correspondingly guided around the loom of cables in order to obtain for example a cylindrical contour. Such guidance can for example take place by way of a rubber grommet. However, the implementation of this method is labour intensive and time consuming.

SUMMARY OF THE INVENTION

Thus, there may be a need to provide a leadthrough element for essentially waterproof leadthrough of one or several lines.

According to one exemplary embodiment of the present invention a leadthrough element is provided which comprises a top and a bottom, wherein the leadthrough element comprises one or several recesses for leading the lines through. In this arrangement each line exits from the top of the leadthrough element in such a way that after exiting, the line runs flat along the top of the leadthrough element.

Advantageously, such leadthrough elements may protect the lines against increased mechanical loads and thus may ensure a permanent seal of the line leadthrough.

A leadthrough element according to an exemplary embodiment of the present invention may be used in a multitude of applications. It is particularly suitable for use in locations where the exiting lines have to be protected against mechanical loads, as is the case for example in the installation of the leadthrough element in the floor panel of an aircraft. In this arrangement, protection against mechanical loads may be ensured already insofar as the leads after exiting run flat along the top of the leadthrough element rather than exiting perpendicularly from the top. It is quite imaginable that the top of said leadthrough element comprises groove-shaped indentations in which the lines which exit flat are guided so that they protrude less far from the top of the leadthrough element or are completely embedded in the top of the leadthrough element.

According to a further exemplary embodiment of the present invention, a first line exits in a first direction from the leadthrough element while a second line exits in a second direction from the leadthrough element. In this arrangement, the first direction runs opposite to the second direction so that the two lines can directly be fed to destinations located in opposite directions. Such an embodiment may offer an advantage in that no further bending of a line is required so that the leadthrough element is not subjected to unnecessary mechanical loads. Furthermore, this embodiment may be advantageous in the installation in a floor channel or a cable duct since the lines can then run protected in the floor channel or the cable duct in opposite directions.

According to a further exemplary embodiment of the present invention, the lines are electrical cables, each with one or several conductors. Due to a firm seat of the electrical cables in the recesses, waterproofness or even airtightness of the leadthrough may be ensured even if the cables or lines are subjected to mechanical loads. This firm seating of the lines may be achieved in that the circumference of the recesses for the line leadthrough is dimensionally smaller than the circumference of the electrical lines, so that the insulating sheathing of an electrical line is compressed by a certain percentage when it is led through, and in that the resulting compression produces increased adhesive strength of the line in the recess. Thus even repeated mechanical loads exerted on the line, as can for example result from tensile forces or shearing forces, may not cause the line to slip, while any waterproofness or airtightness which has been there from the beginning, continues to exist unchanged.

Furthermore, each line may be fed through a recess of its own so that any replacement or any subsequent installation of lines, for example within the context of maintenance or retrofitting work, can be carried out much more easily than is the case with known leadthrough elements or sealing elements, in which complete looms of cables which comprise a multitude of individual cables are led through. It is imaginable that in order to make it possible to install additional lines at a later stage, additional recesses are provided which are closed off by a kind of stopper so as to be waterproof or airtight. This stopper is removed prior to the installation of a further cable, with the respective cable then being led through the now open recess.

According to a further exemplary embodiment of the present invention, the contact areas of the recesses may comprise an adhesive, which may result in an extremely firm and tight seat of the electrical lines in the recesses. The use of an adhesive may make it possible to increase the circumference of the recesses so that pulling an electrical line through is facilitated. This may be particularly advantageous in situations in which the place where the leadthrough element is installed is difficult to access and where it is thus difficult to pull a line with relatively considerable force through a narrow recess. Thereafter, the adhesive can be applied without major expenditure in those locations where the line enters the leadthrough element and exits the leadthrough element, with such application being by spraying on or brushing on. Furthermore, it is imaginable that the adhesive is already applied to the contact areas of the recesses or the line sheath prior to pulling the line through.

According to a further exemplary embodiment of the present invention, the leadthrough element comprises a first and a second component which are compressed during installation of the leadthrough element. In this arrangement the first component comprises a first part of a first recess for leading through a first line, while the second component comprises a second part of the first recess. The first and the second part of the first recess are dimensionally smaller than the first line so that pressure onto the first line is exerted when the two components are compressed during installation of the leadthrough element, with the line thus being closed off so as to provide a seal with contact areas on the first recess. Such a crimp connection may be advantageous if pulling the line through the recesses is undesirable. Here again, for the purpose of providing an even firmer and tighter seat of the lines in the recesses, an adhesive can be used which before the two components are brought together is applied to the contact areas of the recesses and if need be also to the contact areas of the two components.

According to a further exemplary embodiment of the present invention, the first component comprises recesses while the second component comprises projections. During installation of the leadthrough element, the projections of the second component are accommodated in the recesses of the first component so that slipping of the two components in relation to each other is prevented. This additional design of the two components with projections and recesses, for example in the manner of a tongue and groove, may ensure a safe connection of the two components, which connection is able to withstand mechanical loads.

According to a further embodiment of the present invention, the leadthrough element may be placed in an opening in a dividing wall. To this effect, the outside edges of the leadthrough element comprise recesses in the shape of grooves which the edge of the opening engages so as to provide a seal. Advantageously, the recesses on the outside edges are made from a sealing material, such as for example a plastic such as hard rubber or silicon. Manufacturing the leadthrough element from a plastic material may be advantageous in particular with a view to simple processing and the associated reduction in production costs. However, the leadthrough element can also be made from metal so as to further improve stability. Advantageously, manufacture takes place in a metal casting process or a pressing process. Furthermore, it is imaginable that the leadthrough element is partly made of metal and partly made of plastic. For example, the body of the leadthrough element can be made from mechanically loadable metal, while its outside areas, which are to establish sealing connections to adjacent materials, are rubber coated or silicon coated.

According to a further embodiment of the present invention, the plastic material which is used for constructing the sealing element is selected from the group consisting of polyamide, silicon, olefin copolymers (EPDM), hard rubber, soft rubber, polyvinyl chloride (PVC) and polypropylene (PP). Advantageously, the plastic material conforms to the German Airbus standard DAN 1107.

According to a further exemplary embodiment of the present invention, the leadthrough element is designed so as to be suitable for installation in the floor and for leading through electrical lines in an aircraft. In particular, these are so-called IFE lines for IFE control devices in an aircraft of the type AIRBUS A380.

Further objects and advantages of the invention may be derived from the following description.

Below, the invention is described in more detail by means of exemplary embodiments with reference to the drawings.

DETAILED DESCRIPTION OF EXEMPLARY EMBODIMENTS

Figure 1:
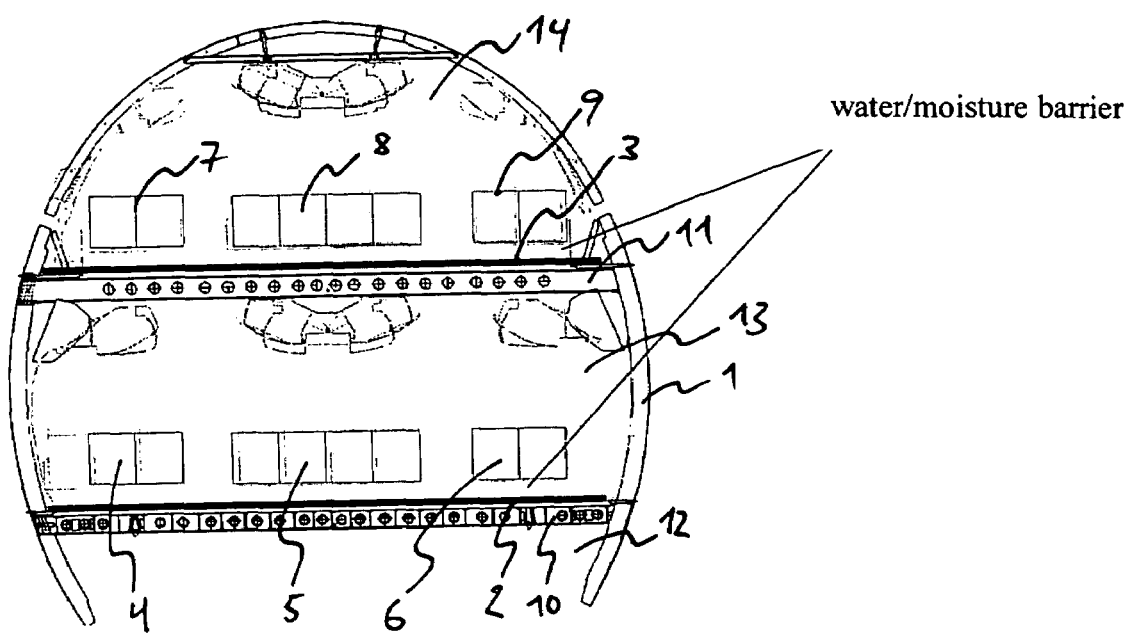
FIG. 1 is a simplified diagrammatic cross-sectional representation of an aircraft in which floor panels leadthrough elements according to the present invention have been installed.

FIG. 1 shows a diagrammatic cross-sectional view of an aircraft. Essentially, the fuselage of the aircraft comprises a skin 1 which shields the interior of the aircraft from the exterior air. The transverse and longitudinal bracing 10, 11 not only serves to provide stability, but also to accommodate the passenger seats 4, 5, 6, 7, 8 and 9. Furthermore, numerous lines, both electrical and other lines, are routed in said transverse and longitudinal bracing 10, 11. The other lines can for example be coolant lines or hydraulics lines. Furthermore, lines for the supply of water or for guiding mechanical elements such as for example Bowden wires for mechanical control of e.g. the elevator or rudder are imaginable. This bracing 10, 11 is covered with floor panels 2, 3 which comprise a water barrier or moisture barrier. Furthermore, it is imaginable that the floor panels abut against each other and against the skin 1 of the aircraft so as to provide an airtight seal, so that various chambers within the aircraft, such as e.g. the load bay 12 and the passenger cabins 13, 14, are insulated from each other so as to be airtight. This is of importance if the load bay 12 is to be opened during flight in order to jettison undesired ballast.

The passenger seats 4, 5, 6, 7, 8 and 9 are screwed to the floor panels 2, 3. To provide current to the electrical devices and instruments in the passenger cabins 13, 14, leadthroughs for electrical lines are provided in the floor panels 2, 3. In conventional aircraft, these electrical lines have hitherto not been routed so as to be waterproof, let alone airtight. In particular in the case of leadthroughs from the lower regions 10, 11 into the passenger cabins 13, 14, no insulation has been provided through which a waterproof or airtight shield between various compartments of an aircraft is ensured. If now for example a passenger spills a drink, it may happen that this liquid enters the cable ducts where it causes further damage in the electrical lines and devices contained therein, for example as a result of a short-circuit or a fire in the cables. Furthermore, residues of liquids or food which collect in the supply ducts in the region of the transverse and longitudinal bracing 10, 11 can cause significant odour nuisance to passengers and on-board personnel alike. It is thus increasingly important in particular in aircraft construction to carry out all floor panels and leadthroughs, openings and the like in such a way that they are essentially waterproof or even airtight.

Furthermore, it is important especially in aircraft construction that lines routed in the passenger cabin are sufficiently robust to withstand mechanical loads, or are largely protected from mechanical loads. However, it is precisely sealing leadthroughs according to the state of the art that are associated with a problem in that the lines exit perpendicularly from the leadthroughs, so that—unless further protective sheathing or protective housings are provided—the lines are mechanically loaded to such an extent by careless passengers and/or their baggage, that the tight seal of the leadthrough deteriorates over time.

Figure 2:
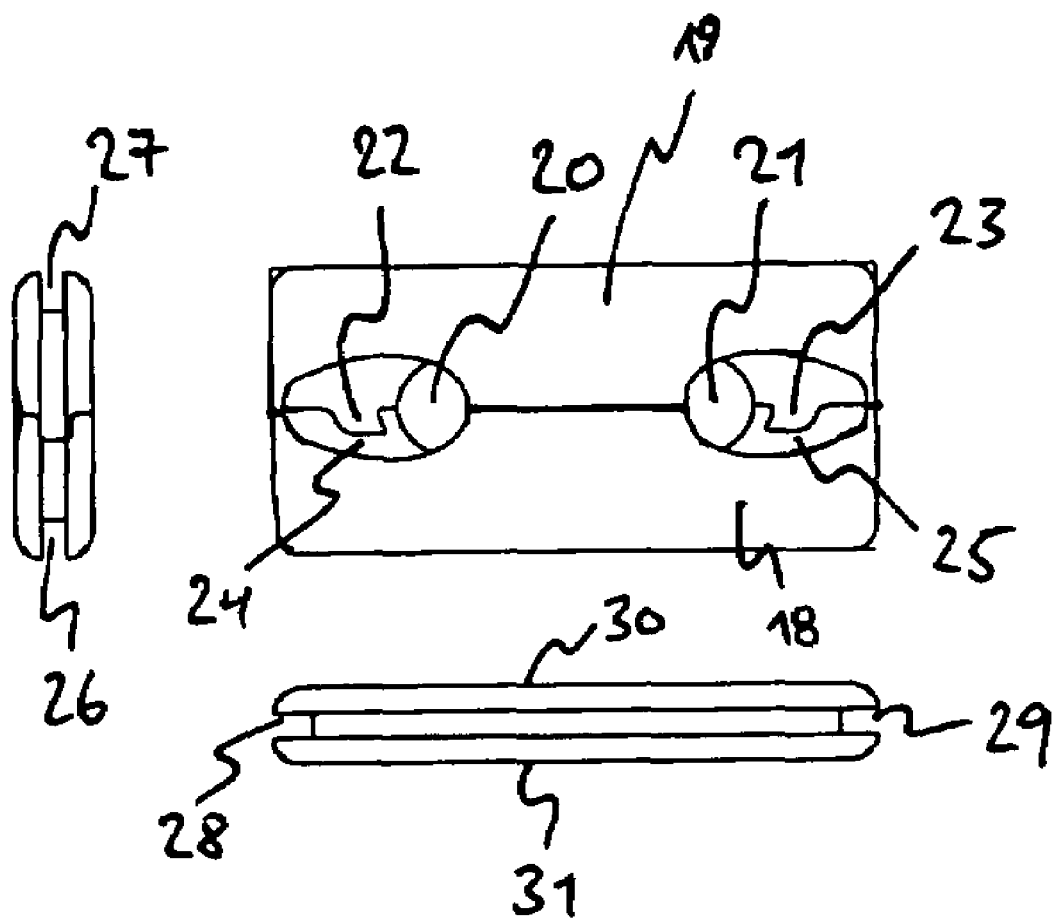
FIG. 2 is a simplified construction drawing of a leadthrough element according to one embodiment of the present invention.

FIG. 2 shows a leadthrough element according to the invention which overcomes the state of the art described above. The leadthrough element comprises a top 30 and a bottom 31. Furthermore, recesses 20, 21 are provided, through which lines can be routed. These lines can for example be hydraulic lines, water supply lines or electrical lines. In this arrangement, each individual line is separately routed in a recess. The contact areas of the recesses establish a tight contact with the routed-through lines so that any waterproofness or airtightness of the leadthroughs is ensured even if the lines are exposed to mechanical load. According to one embodiment of the present invention, the tightness of the seat of the lines in the recesses can be increased by the addition of an adhesive material.

Based on the bent shape of the recesses, a line exits from the top of the leadthrough element at such a shallow angle that the lines after exiting run essentially flat along the top 30 of the leadthrough element. This obviates the need for further protective sheaths or protective housings to protect the lines against mechanical loads, and makes it possible to further route the lines along the floor panels of the cabin.

The leadthrough element according to one embodiment comprises two components 18, 19, which are compressed during installation of the leadthrough element. The first component 18 comprises a first part of a first leadthrough 22, and a first part of a second leadthrough 23. The second component 19 comprises a second part of the first leadthrough 24, and a second part of the second leadthrough 25. The first and the second part of each recess are dimensionally smaller than the respective line which is to be led through the respective recess. This ensures that during installation of the leadthrough element, pressure is exerted on the led-through lines, so that the lines close off so as to provide a tight seal with the contact areas of the recesses. Subsequently, the two components 18, 19 are screwed together, bonded together or permanently interconnected in some other way. Screwing the two components together provides in particular an advantage in that such a connection is reversible and thus any subsequent replacement of individual lines is facilitated.

The first component 18 comprises recesses 24, 25 on the side at which it is connected to the second component 19. In contrast to this, the second component 19 comprises projections 22, 23 which during installation of the leadthrough element are accommodated in the recesses of the first component, in the manner of a tongue and groove, which facilitates installation and effectively prevents slipping of the two components in relation to each other.

To enable installation of the leadthrough element in a hole in a dividing wall or floor panel without the need for any further auxiliaries, the outside edges of the leadthrough element comprise recesses in the form of grooves 26, 27, 28 and 29. In an advantageous embodiment of the present invention, the outside edges are made from rubber or some other plastic material with similar characteristics so that the leadthrough can be pushed into the hole in the dividing wall and subsequently the edge region of the hole engages the grooves, 26, 27, 28, 29 so as to provide a seal. In order to further improve tightness of the seal, prior to installation silicon can be injected into the grooves 26, 27, 28, 29, wherein the silicon after installation establishes a sealed connection with the rim of the hole.

With a view to easy and cost-effective processing and production, the leadthrough element is preferably made from plastic, in particular from polyamide, silicon, olefin copolymers, hard rubber, soft rubber, polyvinyl chloride and polypropylene. However, a multitude of other plastic materials are also imaginable. Of course, the leadthrough element can also be made from metal, for example from aluminum; this increases its strength. Also imaginable is the production of the leadthrough element partly from plastic and partly from metal, or production from different plastics. For example, in one embodiment of the invention the basic body of the leadthrough element is made from aluminum, while the region around the grooves is made from hard rubber. Furthermore, in another embodiment of the invention, the outside edges and recess surfaces comprise a coating, for example a silicon coating which provides a seal. Such a coating ensures good adhesive strength of the line in the recess, and also a tight seal.

Figure 3:
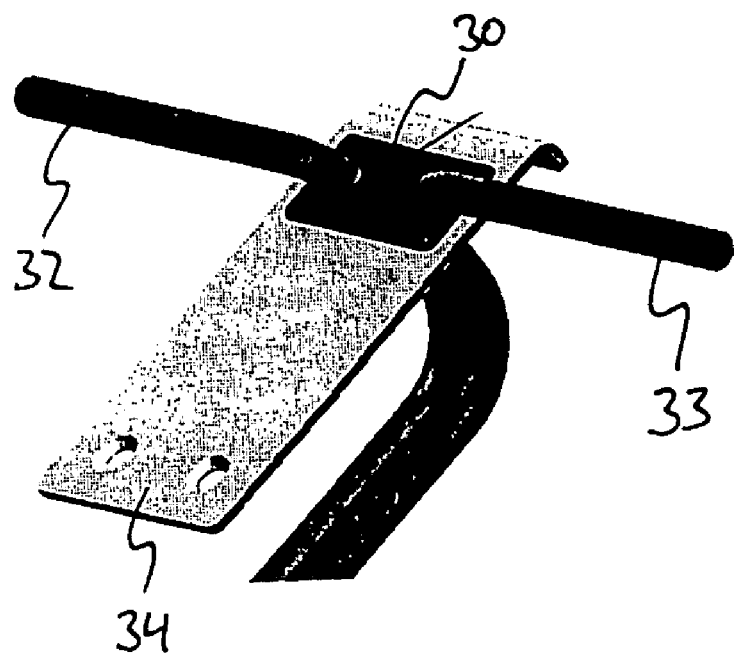
FIG. 3 shows one embodiment of the installation of a leadthrough element according to the invention in a floor panel.

FIG. 3 shows the installation of a leadthrough element 30 according to the invention in a floor panel 34. Two lines 32, 33 entering from below are led through the leadthrough element and exit at its top so as to be essentially flat in relation to the plane of the top. The two lines 32, 33 are so-called IFE lines (In Flight Entertainment lines) for IFE control units in an aircraft of the type AIRBUS A380. The IFE control devices are for example lamps or output stations, installed in the passenger seats, for the on-board entertainment system.

It should be noted that for the demonstrated case, namely an Airbus A380, hitherto there has not been any product available in the global market which would meet the requirements of waterproof line routing through the floor of the Airbus A380.

Figure 4:
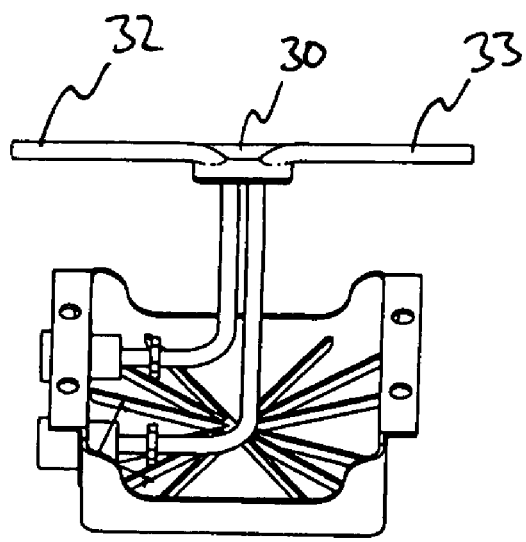
FIG. 4 shows a leadthrough element according to the invention with led-through lines according to one embodiment of the invention.

FIG. 4 shows a corresponding representation of the leadthrough element 30 with led-through lines 32, 33 but without floor panel 34. The leadthrough element 30 can be used in a multitude of applications, in particular however in aircraft construction. In particular, according to the invention, the lines exiting from the floor of the passenger cabin are routed in such a way that at the leadthrough position the passenger compartment is separated from the regions below it in a way which provides a waterproof or even airtight seal.

Figure 5:
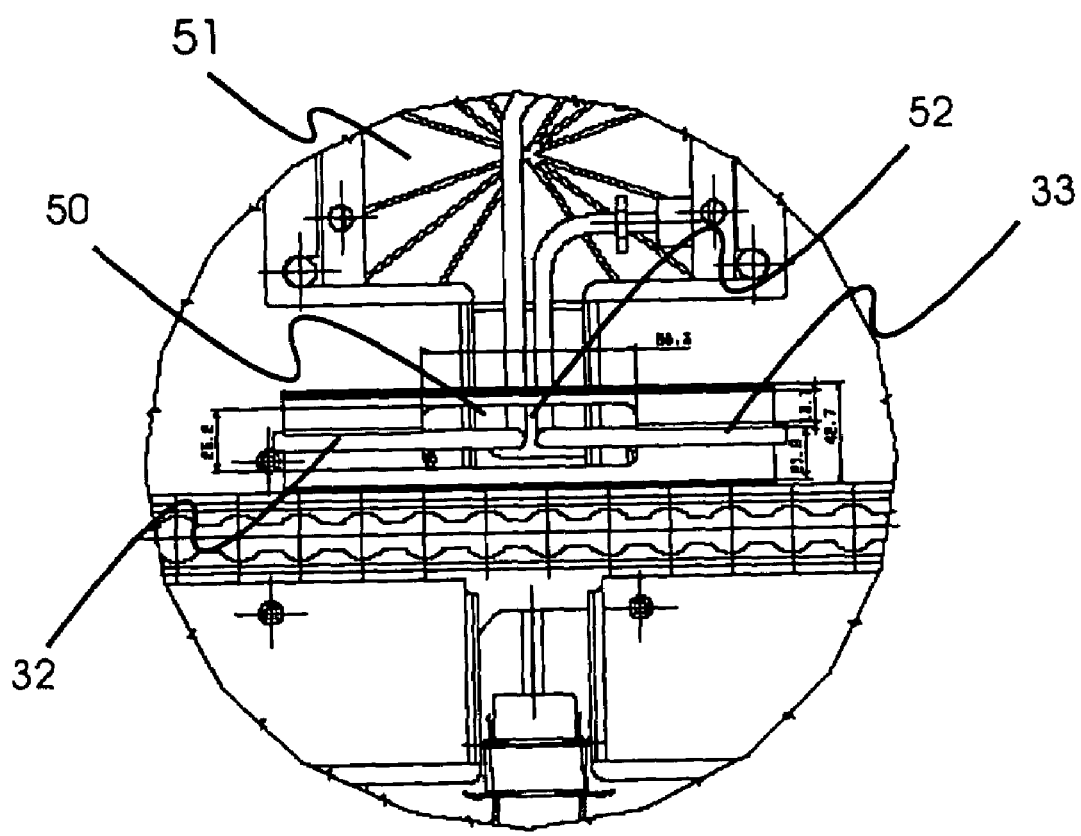
FIG. 5 shows a top view of a construction drawing of the floor of an aircraft of the type Airbus A 380 in the region of a line leadthrough according to one embodiment of the invention.

FIG. 5 shows a top view of a construction drawing of the floor of an aircraft of the type Airbus A 380 in the region of a line leadthrough. Lines 32, 33 are perpendicularly led through the floor panel by the leadthrough element 50, wherein said lines 32, 33 establish an electrical connection between the control device 51 and corresponding output devices which for example are integrated in a passenger seat (not shown in FIG. 5). In this arrangement, the two lines are routed perpendicularly through the leadthrough element 50 at location 52 and provide a tight seal against the element 50.

Figure 6:
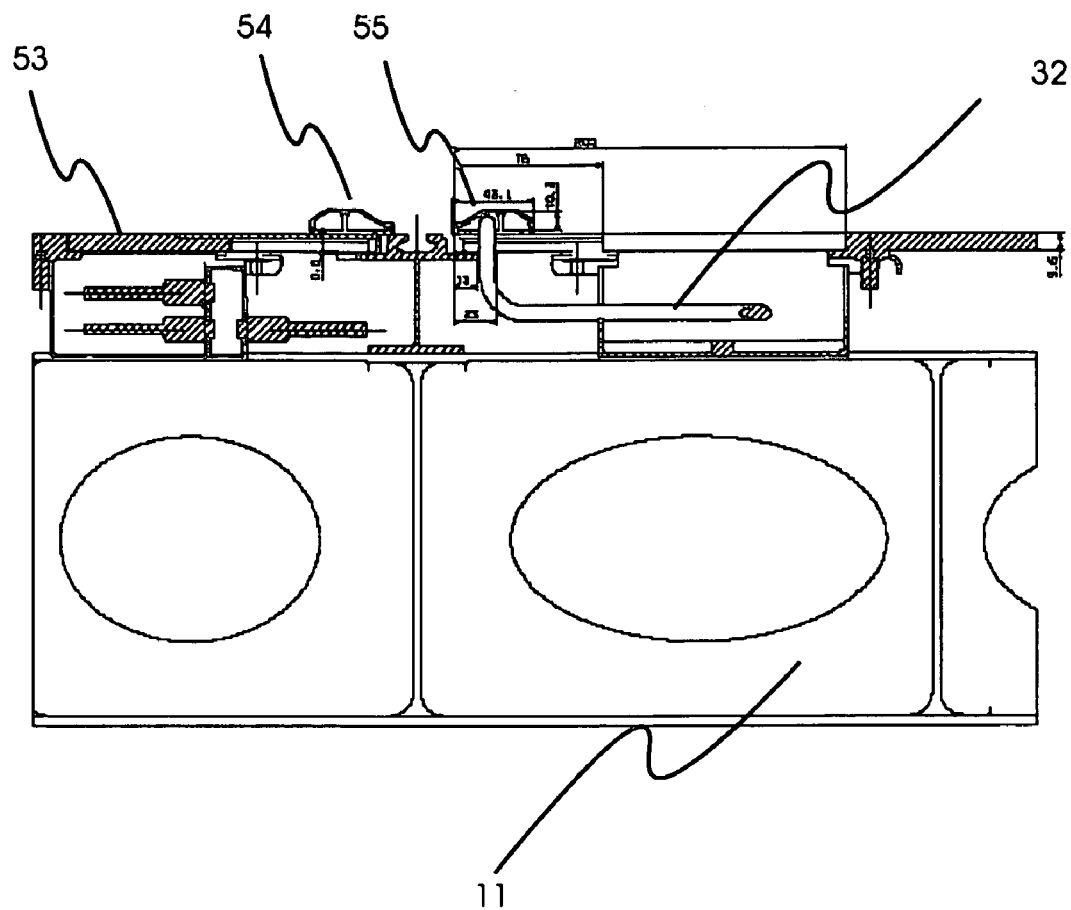
FIG. 6 shows a further construction drawing of the floor region of an aircraft of the type Airbus A 380 in the form of a lateral cross section according to one embodiment of the invention.

FIG. 6 shows a further construction drawing of the floor region of an aircraft of the type Airbus A380 in the form of a lateral cross section. The floor 53, which supports the cable ducts 54 and 55, is arranged on the transverse and longitudinal bracing 11. Coming from below, the line 32 runs perpendicularly through the floor 53 and enters the cable duct 55. Advantageously, the line 32 exits at a shallow angle from the floor leadthrough so that in the cable duct 55 said line continues to extend parallel to the surface of the floor 53. By installing a leadthrough element according to the invention in the location of the floor leadthrough of line 32, a water-resistant to waterproof or even airtight seal of the leadthrough is achieved.

What is claimed is:

1. A leadthrough element for a waterproof leadthrough of a first line, the leadthrough element comprising:
   a top and a bottom; and
   a first recess extending from the bottom to the top and configured to lead the first line through the leadthrough element,
   wherein the leadthrough element is configured such that the first line exits from the top of the leadthrough element in such a way that after exiting, the first line runs flat along the top of the leadthrough element,
   wherein the top of the leadthrough element has a groove-shaped indentation located so that the indentation receives the first line immediately after the exit of the first line from the first recess and directs the first line along the top of the leadthrough element.

2. The leadthrough element of claim 1,
   wherein the leadthrough element is configured to cause the first line to exit in a first direction from the leadthrough element, and the leadthrough element is configured to cause a second line to exit in a second direction from the leadthrough element, wherein the first direction is opposite to the second direction.

3. The leadthrough element of claim 1,
   wherein the first line is comprised of electrical cables, and each cable includes at least one conductor; and
   the leadthrough element comprises at least one additional first recess, the first recess and the additional first recess each configured to provide a seat for each of the electrical cables and to provide waterproofness or airtightness of the leadthrough when the electrical cables are subjected to mechanical loads.

4. The leadthrough element of claim 1,
   wherein the first recess is configured for leading through a single line.

5. The leadthrough element of claim 1,
   wherein the leadthrough element comprises a first and a second component operative to be compressed during installation of the leadthrough element,
   the first component comprises a first part of the first recess for leading through the first line,
   the second component comprises a second part of the first recess, and
   the first and the second parts of the first recess are dimensionally smaller than the first line so that when the first and second components are compressed during installation of the leadthrough element, pressure is exerted onto the first line sufficient to close off the first line so as to provide a tight seal against contact areas of the first recess.

6. The leadthrough element of claim 5,
   wherein the first component comprises a plurality of the first recesses, and
   the second component comprises projections configured to be received during installation of the leadthrough element in the plurality of the first recesses of the first component so as to prevent slipping of the first and second components in relation to each other.

7. The leadthrough element of claim 1,
   wherein the first recess has a contact area, and
   the contact area of the first recess comprises an adhesive operative to provide a tight seal of the first line in the first recess.

8. The leadthrough element of claim 1,
   wherein the leadthrough element is configured for placement in an opening in a dividing wall, and
   wherein outside edges of the leadthrough element form second recesses in the form of grooves in the leadthrough element, such that the second recesses are configured to receive portions of the dividing wall to provide a tight seal.

9. The leadthrough element of claim 1,
   wherein the leadthrough element is at least partly made from plastic or metal.

10. The leadthrough element of claim 9,
    wherein the plastic is selected from the group consisting of polyamide, silicon, olefin copolymers (EPDM), hard rubber, soft rubber, polyvinyl chloride (PVC) and polypropylene (PP).

11. The leadthrough element of claim 1,
    wherein the leadthrough element is configured for installation in a floor of an aircraft and for leading through electrical lines in an aircraft.

12. The leadthrough element of claim 1,
    wherein the leadthrough element is designed for installation in a floor of an AIRBUS A380 aircraft and for leading through In Flight Entertainment electrical lines for In Flight Entertainment control devices.

13. The leadthrough element of claim 1,
wherein the first recess has a bent shape configured to provide for the exit of the first line at less than 90 degrees with respect to the top of the leadthrough element.

14. The leadthrough element of claim 1,
wherein the groove-shaped indentation is configured to receive at least most of a depth of the first line.

15. In a combination, the leadthrough element of claim 1 and the first line led through the first recess and out the top of the leadthrough element, the leadthrough element and the first line cooperating such that after exit of the first line, the first line runs flat along the top of the leadthrough element.

16. A leadthrough element for a waterproof leadthrough of a first line, the leadthrough element comprising:
   a top and a bottom; and
   a first recess extending from the bottom to the top and configured to lead the first line through the leadthrough element;
   the leadthrough element is configured such that the first line exits from the top of the leadthrough element in such a way that after exiting, the first line runs flat along the top of the leadthrough element; and
   the leadthrough element is further configured to cause the first line to exit in a first direction from the leadthrough element, and the leadthrough element is configured to cause a second line to exit in a second direction from the leadthrough element, wherein the first direction is opposite to the second direction.

17. A leadthrough element for a waterproof leadthrough of a first line, the leadthrough element comprising:
   a top and a bottom; and
   a first recess extending from the bottom to the top and configured to lead the first line through the leadthrough element, wherein the first line comprises electrical cables, each cable including at least one conductor; and
   at least one additional first recess, the first recess and the additional first recess each configured to provide a seat for each of the electrical cables and to provide waterproofness or airtightness of the leadthrough when the electrical cables are subjected to mechanical loads,
   the leadthrough element configured such that the first line exits from the top of the leadthrough element in such a way that after exiting, the first line runs flat along the top of the leadthrough element.

\* \* \* \* \*